Figure 1:
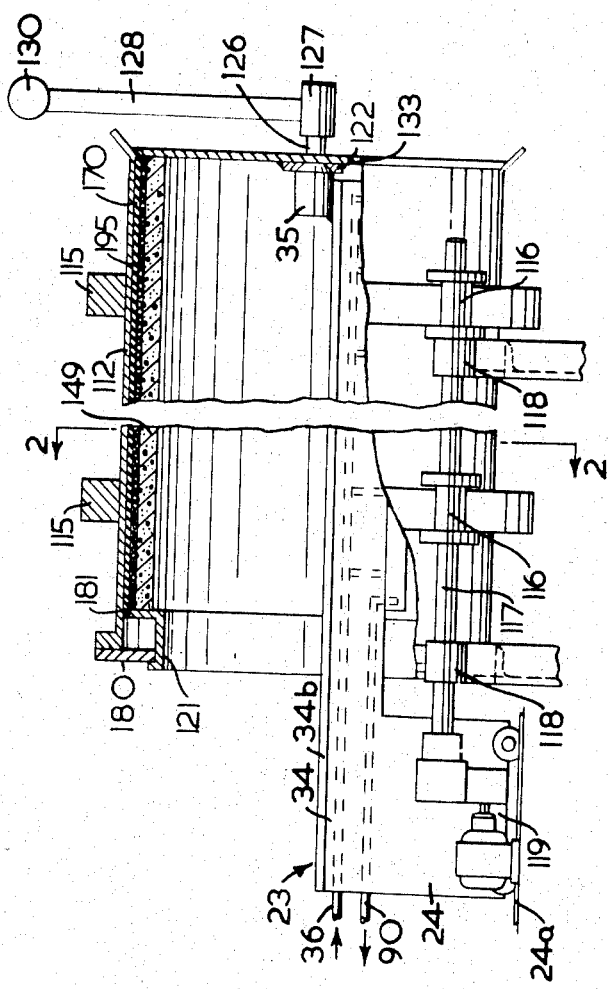

United States Patent [19]
Barratt

[11] 3,778,206
[45] Dec. 11, 1973

[54] APPARATUS FOR PRODUCING CEMENT SHEETS

[76] Inventor: William C. Barratt, 595 Sheppard St., Niagara Falls, Ontario, Canada

[22] Filed: Jan. 3, 1973

[21] Appl. No.: 320,768

Related U.S. Application Data

[63] Continuation-in-part of Ser. No. 166,780, July 28, 1971, abandoned.

[30] Foreign Application Priority Data
Feb. 1, 1972 Great Britain.................4712/72

[52] U.S. Cl................. 425/86, 264/311, 425/297, 425/435, 425/436
[51] Int. Cl............................................ B28b 21/08
[58] Field of Search................. 425/86, 182, 297, 425/308, 324, 425, 426, 427, 435, 436, DIG. 44, DIG. 124; 249/112; 264/86, 159, 311

[56] References Cited
UNITED STATES PATENTS

| | | | |
|---|---|---|---|
| 1,786,586 | 12/1930 | Walter................................ | 264/86 |
| 2,497,160 | 2/1950 | Fejmert............................. | 425/426 |
| 2,856,632 | 10/1958 | Rekettye...................... | 264/DIG. 78 |
| 2,993,235 | 7/1961 | Brown et al. ...................... | 264/311 |
| 3,635,281 | 1/1972 | Comte et al. ...................... | 425/436 |

Primary Examiner—H. A. Kilby, Jr.
Attorney—John W. Malley et al.

[57] ABSTRACT

Apparatus for producing a cement sheet, including a rotatable mould into which a cement mix is fed to form a soft, centrifugally moulded cylinder, which is then removed from the mould, divided longitudinally, and laid out flat to harden. The mould is initially fitted with a flexible liner of metal, rubber or plastics. The soft cement cylinder is removed by means of a mandrel inserted into the cylinder while in the mould. During removal from the mould, the cement cylinder is held onto the mandrel either by vacuum applied to perforations in the wall of the mandrel, or by connecting together the edges of the liner which surrounds the cylinder while it is removed from the mould on the mandrel. The longitudinal division in the cement cylinder may be formed by a longitudinal inwardly projecting member within the mould or forming part of the liner, or by slitting the cylinder on the mandrel after its removal from the mould. The apparatus is particularly useful for producing small quantities of asbestos cement sheets with special laminations or surface effects. Apparatus in accordance with the invention may be used for producing sheets of flowable hardenable material other than cement.

16 Claims, 19 Drawing Figures

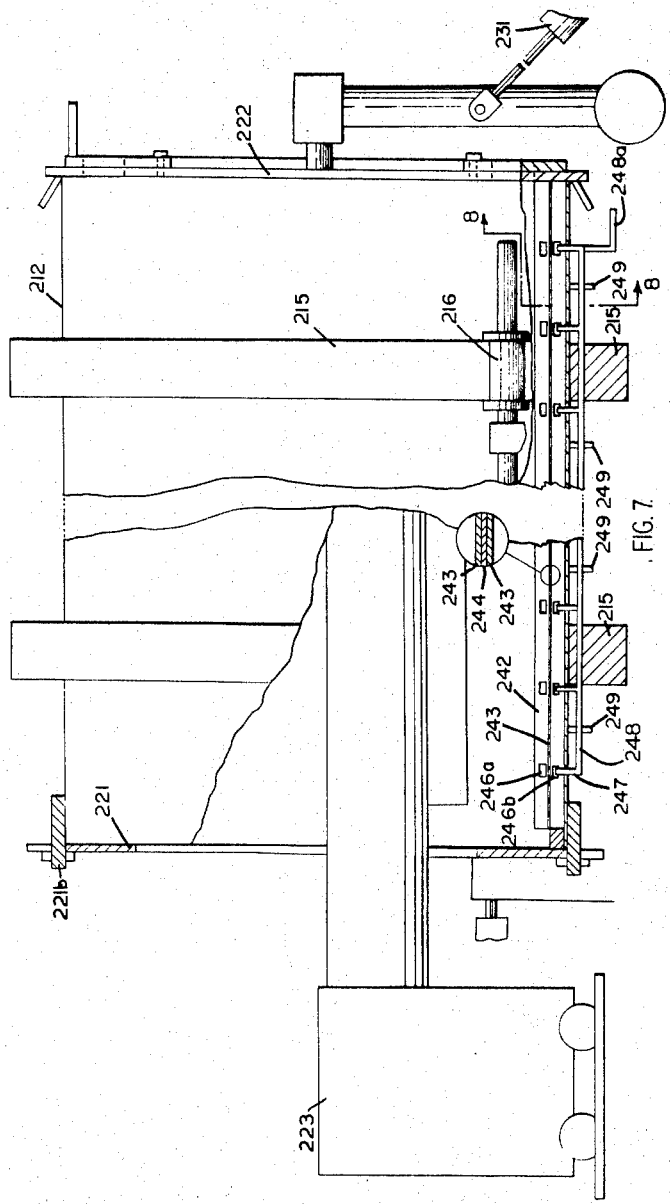

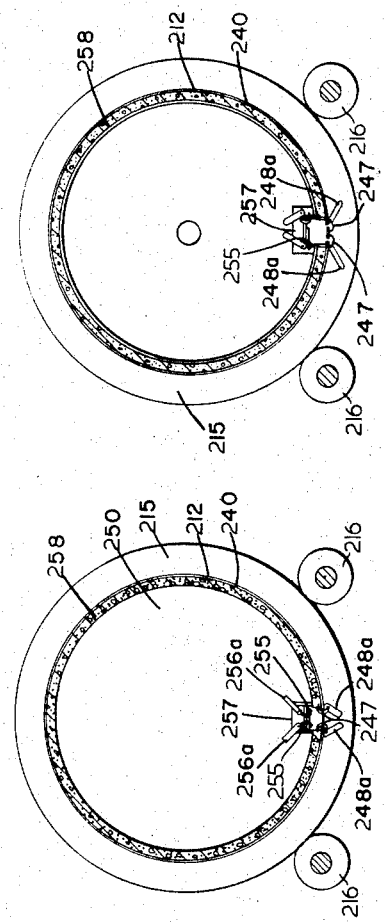

APPARATUS FOR PRODUCING CEMENT SHEETS

This application is a continuation-in-part of my United States Patent Application Ser. No. 166,780, filed July 28, 1971 now abandoned.

The present invention relates to apparatus for producing sheets from a flowable hardenable material such as cement, which sheets may be flat, curved or contoured. This invention provides apparatus for performing the process of co-pending Patent Application Ser. No. 166,778 also filed July 28, 1971. The sheets may be used either as produced or cut to smaller sizes, for example as structural members, wall panels, or roof sections, or for decorative components such as tiles, moulds, millwork or shingles.

In the known wet process for manufacturing cement sheets, and particularly asbestos cement sheets, a large plant is required which in order to be economical must operate on a high production basis, and such a process is not easily adapted for producing small quantities of special decorative materials.

The present invention provides apparatus which is suited to the economical production of small quantities of cement sheets, and which can readily be adapted to produce a wide variety of surface finishes, or other characteristics, in the cement sheets produced. The apparatus produces the cement sheets singly, one after the other, and it is a very simple matter to modify the operation of the apparatus between individual sheets, so that a wide variety of different cement sheets can be produced in a short time. The cement sheets can vary as to thickness, composition, colour, and the nature and shape of the surface finish. The apparatus thus is very suitable for producing a lot of different components, having different shapes and surface finishes, for a single building. The apparatus used in accordance with the invention does not require a large investment or take up a large amount of space, so that it is very suitable for location in the locality where building is taking place. Furthermore, the nature of the process used gives a high strength product due to avoidance of excess water, uniformity of wall thickness, high density and predetermined directional resistance to stresses. In the case of cement reinforced by fibres, such as asbestos cement, additional strength is given by good orientation and formation of fibres. Also, the process operates with very little waste.

In the process described in copending application Ser. No. 166,778 a cement sheet is produced by a centrifugal casting method, the cement mix (including water) being fed into a rotatable cylindrical mould and spun to distribute the mix evenly around the mould wall to shape the mix into a hollow cement cylinder. One end plate of the mould is removable to allow for axial removal of the cement cylinder, and in order to effect this removal a cylindrical mandrel is inserted into the mould to engage the inner surface of the cement cylinder, which is then withdrawn on the mandrel. After removal, and with the cement cylinder still in the soft or flaccid state, the cement cylinder is divided longitudinally and the resultant sheet is laid out onto a flat or curved surface and allowed to harden. Before hardening, the cement sheet may be pressed between two platens, and one of these platens may carry a design in relief to produce a corresponding relief design on the cement sheet.

The present invention provides apparatus for performing this process comprising:

a. a cylindrical mould mounted for rotation on a horizontal axis and having a removable end plate, said mould and end plate being such that a cylindrical body formed within the mould can be extracted by sliding without dimensional change after removal of said end plate;

b. means for feeding said material directly onto the inner surface of a liner held within said mould, c. a mandrel movable axially into the mould through the end of the mould having the removable end plate, said mandrel having a cylindrical surface engageable with the inside surface of a hollow cylindrical body of the material formed within the mould by spinning, d. mounting means for said mandrel allowing movement thereof axially into the mould and also allowing rotation thereof after removal from the mould and allowing relative transverse movement between the mandrel and a receiving surface for the sheet, e. a flexible liner dimensioned to fit within the cylindrical inner surface of the mould, the edges of said liner which are adjacent each other when in the mould being provided with radially extending elements, f. releasable connecting means for holding said radially extending elements to prevent separation thereof after removal of said mandrel, with said hollow cylindrical body and said liner, from the mould, and g. means for forming a longitudinal division in said cement body, to allow the body to be unrolled from the mandrel after removal from the mould.

The mandrel mounting means may be a special rail-mounted carriage, or ordinary handling means such as a crane or hoist.

The means for forming a longitudinal division in the cement cylinder may be slitting means such as a blade or a wire band saw, applied to the underside of the cylinder while held on the mandrel. Alternatively, the mould or the liner may be provided with an inwardly projecting member arranged to form a longitudinal discontinuity in the cylinder formed in the mould, in which case the dividing step involves merely splitting the cylinder along this discontinuity.

The flexible liner may be formed for example of sheet metal or rubber, bendable to form a cylindrical surface within the mould, and having a longitudinal division so that it may be laid out flat with the sheet of material formed in the mould. The radially extending elements may be flanges on the liner edges, extending outwardly or inwardly, releasable means being provided for connecting these together when the mandrel is inside the cylinder so that the liner can assist in holding the cylinder onto the mandrel. The liner edge portions may be directly connected together, as by means of a clip, or may be indirectly connected together as by being individually connected to holding means carried by the mandrel. The liner may become incorporated in the final product, or may be separated from the final sheet and re-used. The adjacent edge portions of the liner may be spaced apart (while surrounding the cylinder) so as to allow the cylinder to be slit through the gap between the edge portions. Alternatively, an edge portion of the liner may be bent inwardly to form an inwardly projecting member within the mould, this member forming a longitudinal discontinuity in the cylinder so that no slitting step is required.

Figure 2:
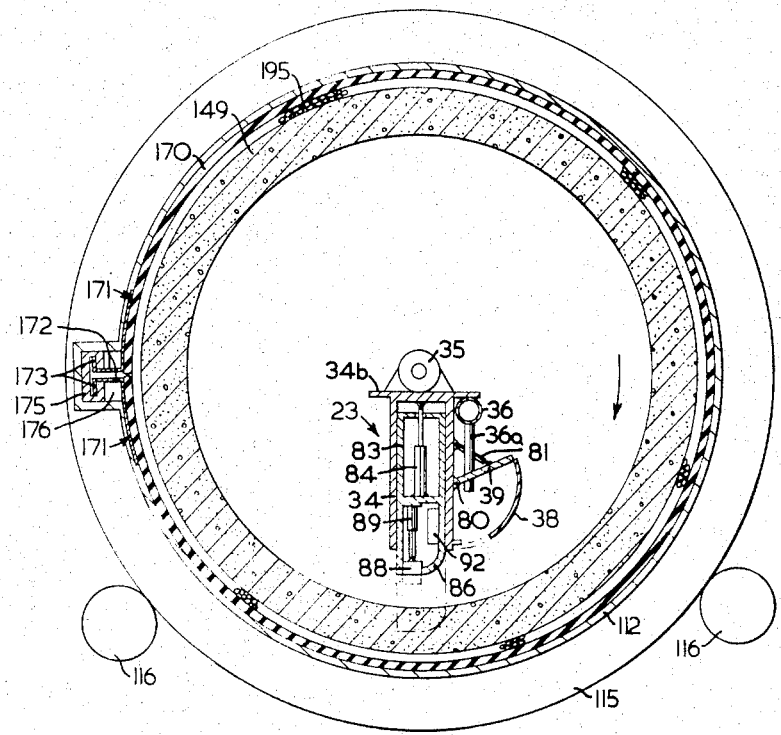
Figure 3:
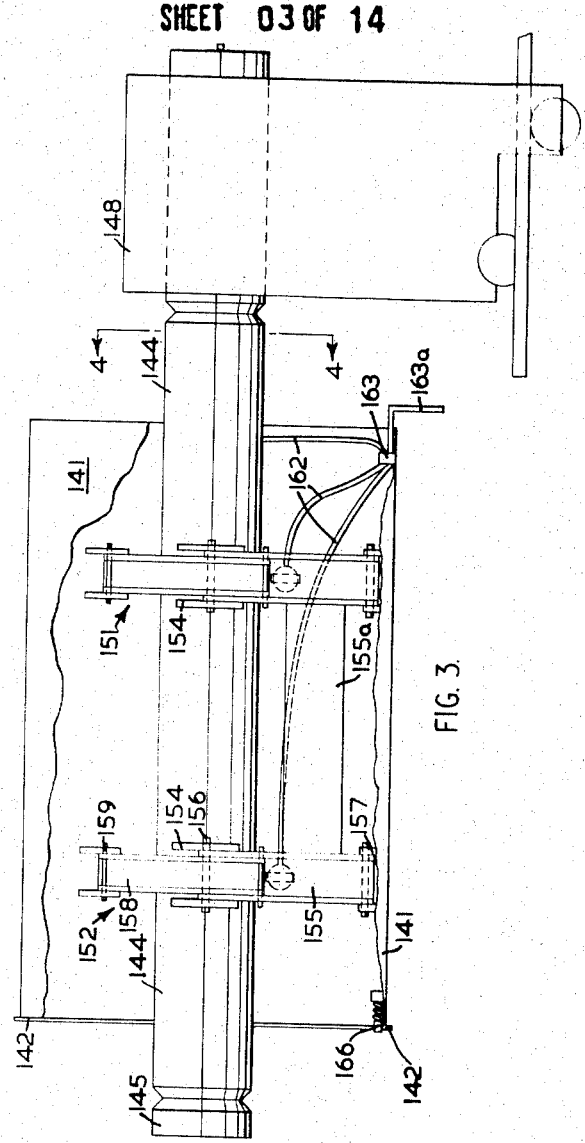
Figure 4:
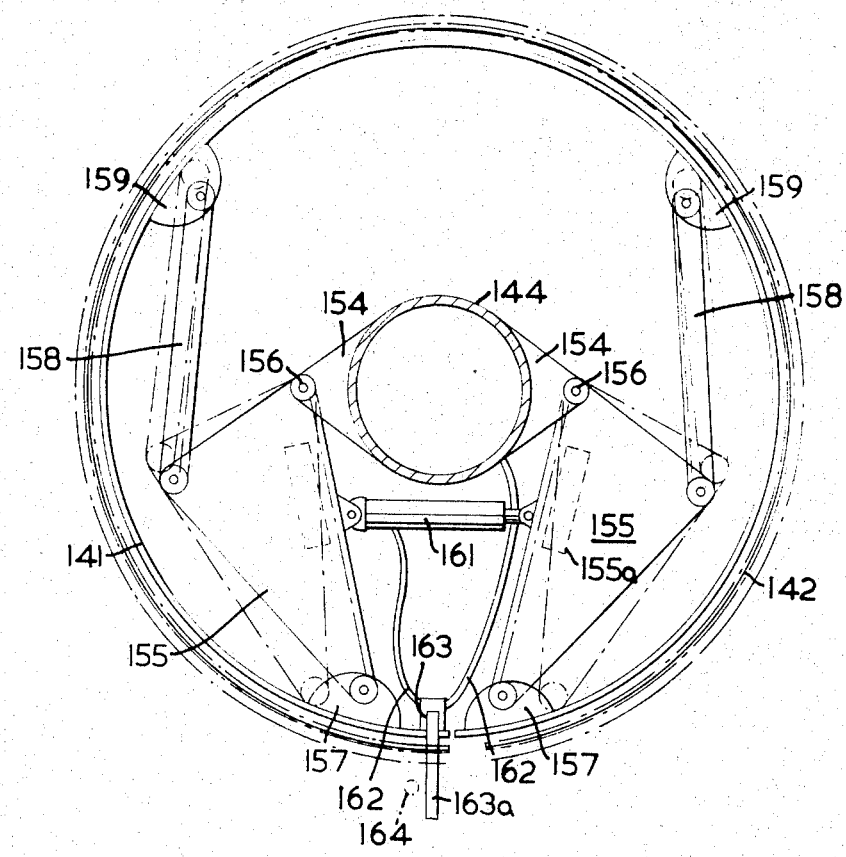
Figure 5:
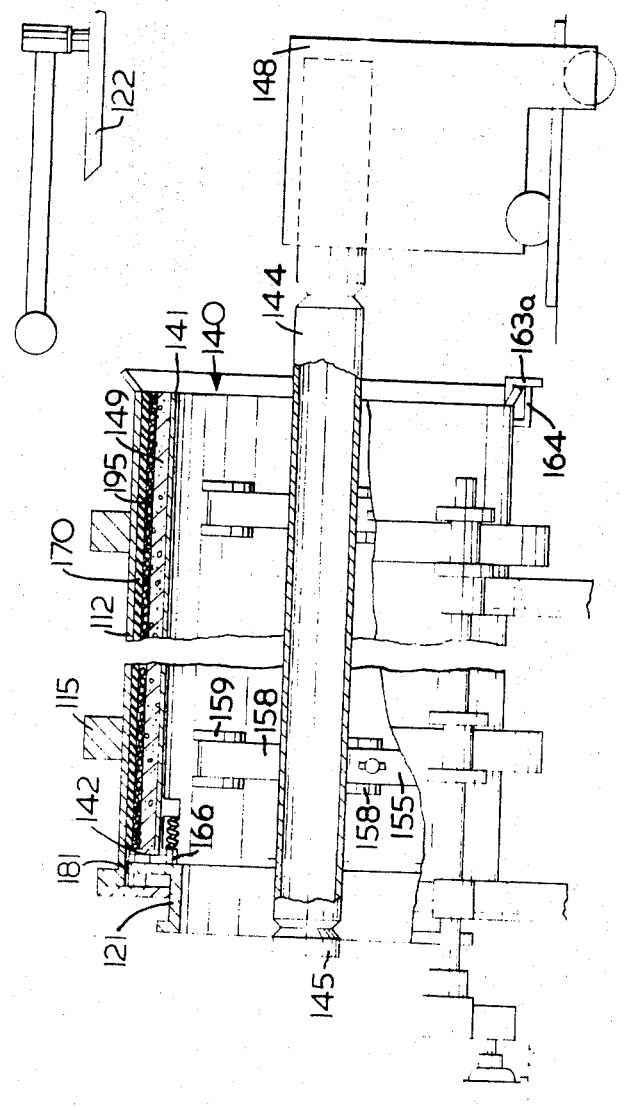
Figure 6A:
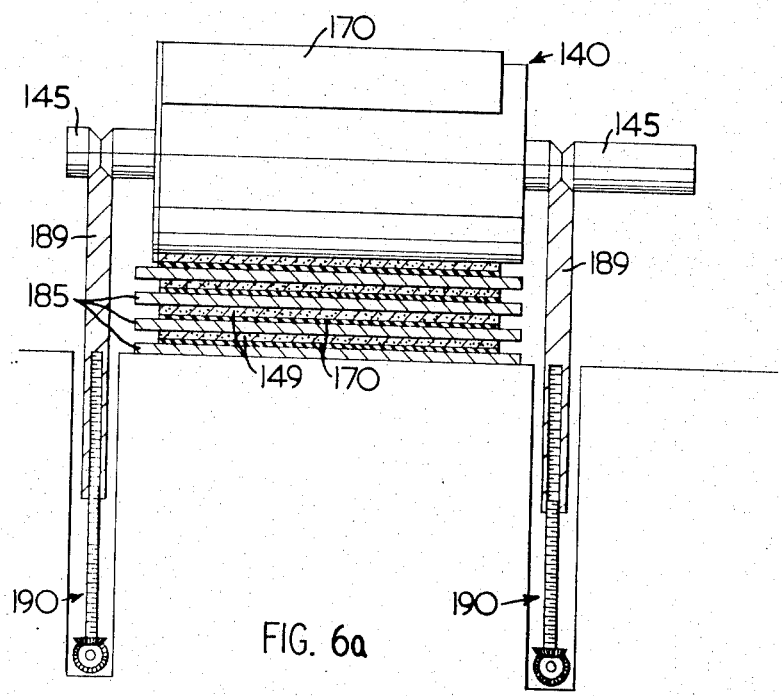
Figure 6B:
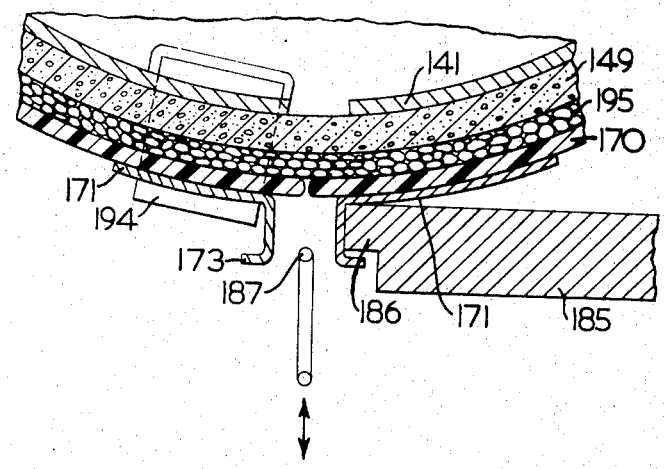
Figure 6C:
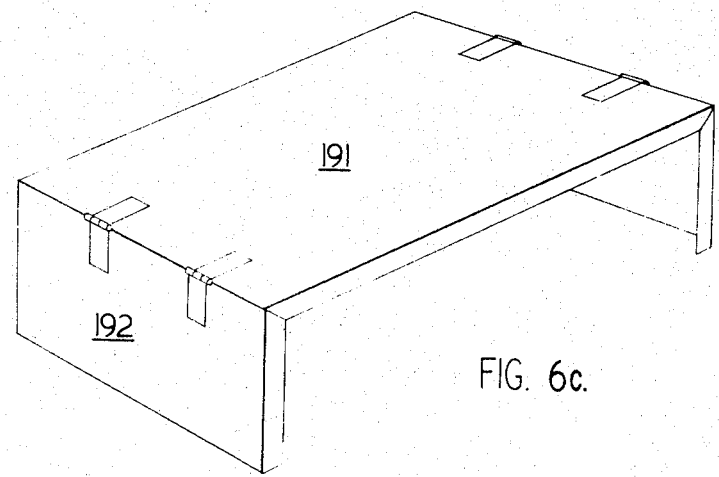
Figure 8:
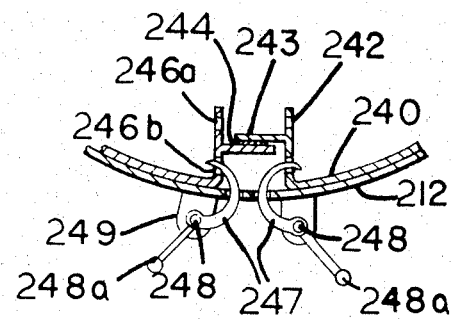
Figure 10:
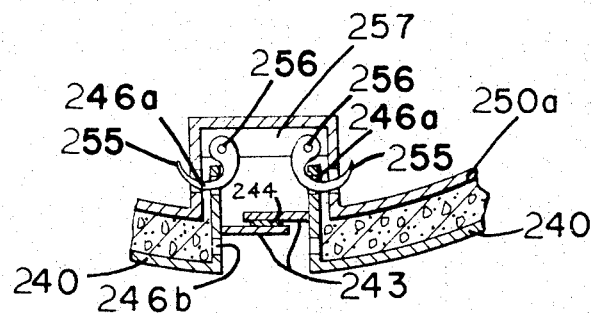
Figure 9:
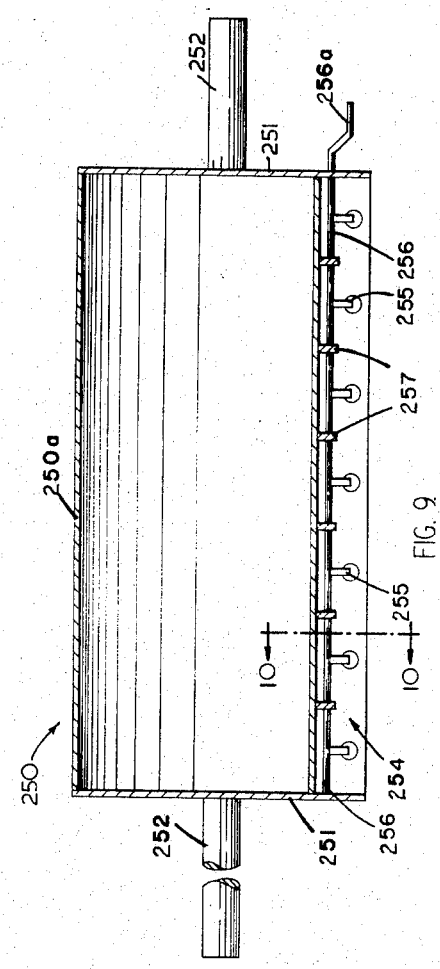
Figure 13:
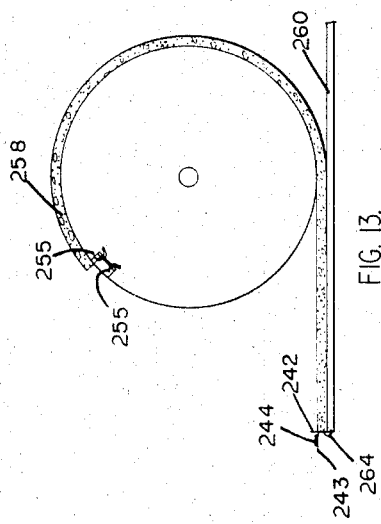
Figure 14:
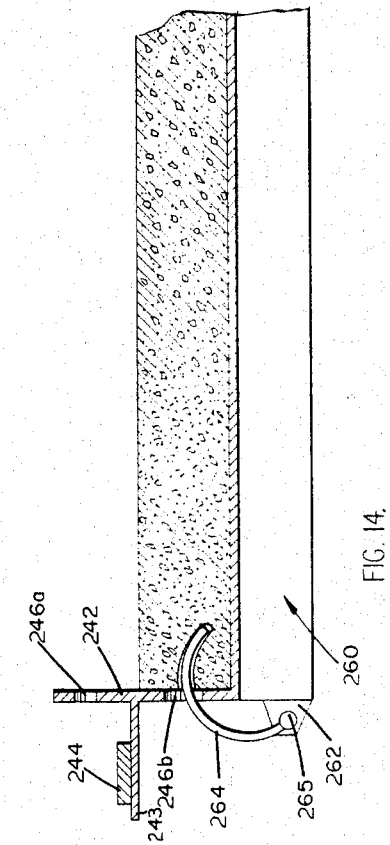
Figure 15:
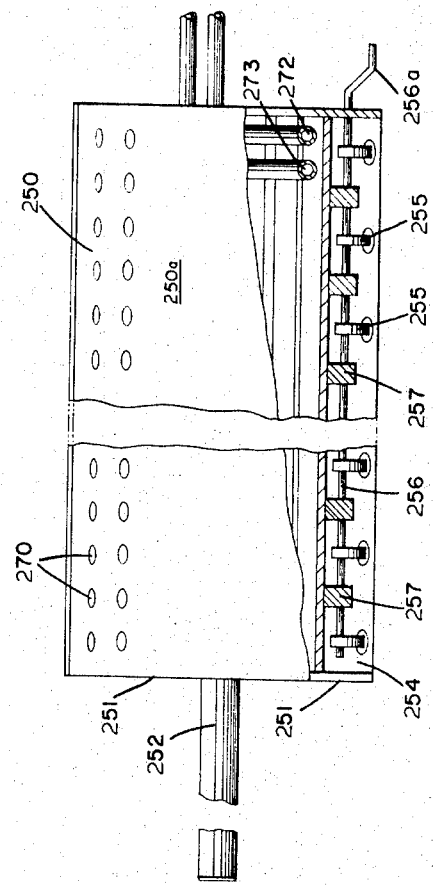
Figure 16:
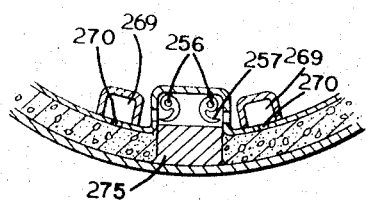
Figure 17:
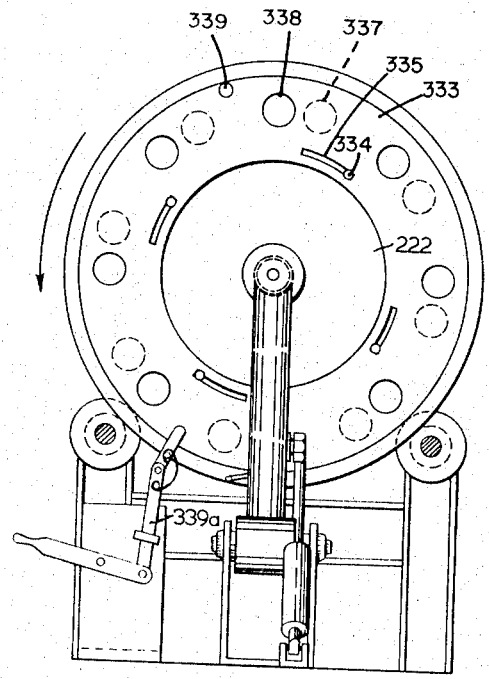

The process and apparatus will be particularly described by way of example with reference to the accompanying drawings in which:

FIG. 1 is a partly sectioned elevation of a first type of centrifugal mould for use in accordance with the invention;

FIG. 2 is a cross section on lines 2—2 of FIG. 1 showing details of liner locking means, FIG. 3 is a partly broken-away side view of a mandrel suitable for use with the apparatus of FIGS. 1 and 2, FIG. 4 is a sectional view of the mandrel on lines 4—4 of FIG. 3, FIG. 5 is a partly sectioned view of the mould of FIG. 1 with the mandrel in place, FIGS. 6a, 6b and 6c illustrate modified apparatus for slitting, laying out and curing the cement sheets, FIG. 7 is a partly sectioned elevation of a second type of centrifugal mould with a removable liner in place, FIG. 8 is an enlarged view in cross-section of a portion of the mould, on lines 8—8 of FIG. 7, FIG. 9 is a sectional view of a mandrel for use with the mould of FIGS. 7 and 8, FIG. 10 is an enlarged view of a cross-section through the mandrel on line 10—10 of FIG. 9, FIGS. 11 and 12 show diagrammatic end views of the mould of FIGS. 7 and 8 with the mandrel of FIG. 9 inserted therein, at different stages in the process, FIG. 13 is a view of the mandrel of FIG. 9 in the last stage of the process, FIG. 14 shows an enlarged view of a platen with the cement sheet laid out thereon, FIG. 15 shows a partly sectioned view of a combined vacuum and liner holding mandrel, FIG. 16 shows a cross-sectional view of part of the mandrel of FIG. 15 engaging a cement cylinder within a mould, and FIG. 17 shows an end view of a mould with modified means for removing water from the cement.

Referring to FIGS. 1 and 2, the apparatus includes a rotatable centrifugal mould having a cylindrical wall 112. The mould wall 112 is reinforced by reinforcing rings or tires 115 which rest on four rollers 116. The rollers 116 are carried by two parallel horizontal shafts 117, supported in bearings 118, and one of these shafts is driven by a motor and gearbox combination 119. When the motor is operated to drive the shaft 117, the frictional contact between rollers 116 and the tires 115 causes the mould to rotate about its horizontal axis.

The mould has at one end an axially movable annular member 121, and at the other end a removable end plate 122. The annular member 121 is termed a void ring, and this void ring is of channe form, having an outwardly facing opening engaged by an annular plate 180 which is bolted to the end flange of the mould. The void ring is movable axially of the mould between the positions shown in FIGS. 1 and 5 and sealing means 181 provide a seal between the inner flange of the ring and the inner surface of the mould. The void ring 121 has a radial dimension greater than that of the thickest cylinders to be spun within the mould, and has interior dimensions large enough to allow space for entry of a charging head 23 which is described hereinafter.

The removable end plate 122 is mounted on an axially projecting stub shaft 126, which is carried in a bearing 127 supported at the end of a swing arm 128. The swing arm is pivoted at 130 and is rotatable from the closed position of FIG. 1 to the open position of FIG. 3 by means of a power cylinder (not shown). The inside of end plate 122 is provided with a central locating ring 133 having an inner surface which flares outwardly towards the other end of the mould, and which serves to support and locate one end of the charging head 23.

It will be apparent that the end plate 122 need not entirely cover the end of the mould, but may instead provide a cover over an annular portion only, of radial thickness greater than that of the cylinder to be spun therein.

The charging head 23, as shown in FIG. 1, is mounted on a support carriage 24 mounted on rails 24a adjacent that end of the mould with the fixed end plate. These rails allow movement of the charging head from the operative position of FIG. 1, in which the charging head extends through the fixed void ring 121, to a retracted position in which the charging head is withdrawn clear of the mould.

The charging head comprises a horizontally extending support member somewhat longer than the mould in the form of a parallel sided channel 34 open at its lower end and reinforced at its top by a horizontal plate 34b. At its outer end (remote from the carriage 24) the plate 34b carries a positioning pin 35, which, when the charging head is in the position of FIG. 1, locates in the locating ring 133 and assists in supporting the outer end of the charging head. The support member carries at one side a cement feed pipe 36, having downwardly extending distribution pipes 36a spaced along the pipe 36 at 1 foot spacing. Below the lower ends of pipes 36a there is provided a curved shutter 38 which, when in the closed position shown in broken lines, co-operates with the outside of the channel 34 to provide a trough suitable for retaining a quantity of particulate material. The shutter 38 is mounted on radial arms 39 pivoted to the support member at 80 and pivotally movable relative to the support member by fluid cylinder 81 to move ths shutter into the open position shown in full lines, allowing material held in the shutter to be released onto the inside of the mould or to be fed directly into the mould from discharge pipes 36a.

The channel 34 accommodates a hollow, parallel sided member 83 vertically slidable therein under the control of hydraulic cylinder 84. The lower end of member 83 has a curved corner joining the vertical side of the member 83 with the horizontal lower edge thereof, this curved corner facing the direction of rotation of the mould which direction is indicated by the arrow. This curved corner and the adjacent surfaces of member 83 form spreader means 86 having a hard facing and capable of contacting the inner surface of a hollow cylinder of material being fed into the mould, to assist in evenly spreading the material within the mould. During the stage in which material is being fed into the mould via pipes 36a, the spreader means is caused to rise at a steady rate under control of fluid cylinder 84.

The member 83 also incorporates means for removing water from within the centre of the cylinder of material being spun within the mould, in the form of a skimmer 88 which is movable by fluid cylinder 89 between a retracted position in which it does not extend below the surface of the spreader means, to an extended position as shown in broken lines in which it projects below the lower surface of the spreader means. The skimmer 88 has an opening facing the direction of rotation of the mould, and which communicates with a water discharge pipe 90 extending along the member 83.

The member 83 also incorporates a vibrator 92 mounted on the inside of the spreader means and arranged to cause vibration of the spreader means for compacting material in the mould.

FIG. 2 also shows a special form of liner 170 used in this embodiment. This liner is a sheet of abrasion resistant rubber of ½ inch (12 mm) thickness sufficiently flexible to form a cylinder lining the mould as shown. The liner has opposite edge portions which are adjacent while the liner is in the mould, the edge portions being bonded to sheet metal edge pieces 171. The edges of the liner extend beyond the edge pieces 171 to form a seal preventing cement or other material from passing between the edge pieces 171. The edge pieces 171 are provided with radially outwardly directed flanges 172 which are spaced apart while the liner is in the mould so that after extraction from the mould the cylinder of material can be slit while the liner is still in place. The outer edges of these flanges have lips 173 bent back parallel to the liner surface and forming a recess therewith. These recesses are engageable by the inwardly directed jaws of a locking clip 175, the cross-sectional form of which is shown in FIG. 2, and which is accommodated in a suitably shaped longitudinal groove 176 in the mould surface. The clip 175 thus co-operates with the edge pieces 171 to hold the edge portions of the liner together when the cylinder and liner are removed together from the mould, as will be described, thus holding the cement cylinders on the mandrel when removed from the mould. To facilitate removal from the mould, the outside surface of the liner, and the inside surface of the mould, are coated with polytetrafluoroethylene.

The mandrel 140 used with this mould is an expanding mandrel as shown in FIGS. 3 and 4. The mandrel includes a cylindrically curved surface formed by a slightly flexible metal plate 141, the longitudinal edges of which are close together when the plate 141 is unstressed and is at its minimum diameter as indicated in full lines in FIG. 4. The plate 141 has an annular end flange 142 at one end, and is capable of being expanded by means to be described to the condition shown in broken lines in FIG. 4, the amount of radial expansion being greater than the radial depth of flange 142.

The mandrel is mounted on a tubular shaft 144 carried at its inner end by a rail mounted carriage 148, the carriage allowing axial movement of the mandrel into the mould and also allowing free rotation of the shaft 144. The shaft 144 has an extension 145 at the outer end of the mandrel (i.e., that remote from the carriage 148), which serves a purpose to be described. The shaft 144 carries two axially spaced expanding arrangements 151 and 152 by which the plate 141 is connected to the shaft 144. Each expanding arrangement comprises two opposed pairs of gussets 154 welded to shaft 144 and two symmetrically arranged triangular crank members 155 each having a first corner pivoted at 156 to gussets 154, a second corner pivoted to gussets 157 which are welded internally to plate 141 near to the longitudinal edges thereof, and a third corner pivotally connected by links 158 to gussets 159. Both crank members 155 and links 158 are of channel form, having parallel side plates or flanges connected by a web, and the crank members are connected for movement together by plate 155a. The gussets 159 are welded to the inside of plate 141 at locations spaced away from gussets 157, being on the opposite side of a plane through pivots 156 from these gussets 157. The spacing between adjacent gussets 157 and 159 is roughly equivalent to that between the two gussets 159, this spacing being of the order of 100° to 120° of arc subtended at the axis of shaft 144. The two crank members 155 are arranged to be urged apart by a pneumatic cylinder 161, this cylinder being connected by a flexible conduit 162 via a rotary shut off valve 163 to an air space within the hollow shaft 144. The space within the shaft 144 is closed apart from the conduit 162 and a quick connector coupling by means of which a charge of compressed gas can be admitted into this space. The valve 163 is biassed into a shut position, but is arranged to be opened by rotary movement which occurs when the valve arm 163a, extending radially from the inside end of the mandrel, is pivoted sideways by contact with an arm 164 which rotates with the mould. Admission of pressurized air into cylinder 161 is arranged to cause extension of this cylinder, with consequent outwards movement of members 155 and expansion of the plate 141 into the broken line position. The pivotal movement of valve arm 163a is limited so that after the valve 163 has been opened by arm 164 of the mould these arms continue to engage with each other causing rotation of the mandrel with the mould. The arms 163a and 164 are so situated on the mandrel and mould respectively as to cause the mandrel to be rotated with the mould in such position that the adjacent longitudinal edges of the plate 141 forming the mandrel surface are disposed adjacent the junction in the liner 170 (see FIG. 2), so that after expansion of the mandrel a gap is provided in the cylindrical surface of the mandrel which gap underlies that between the flanges 172 of the liner.

The outer end of the mandrel is provided with a protruding spring loaded plunger 166, positioned to engage the void ring 121 so that this void ring is pushed away from a cement cylinder formed in the mould on positioning of the mandrel in this cylinder.

In operation, liner 170 is fitted into the mould, the end plate 122 is placed in the closed position, and the void ring 121 placed in the inner position shown in FIG. 1. With the shutter 38 of the charging head 23 held closed by cylinder 81, the trough formed by this shutter is filled with aggregate material. The charging head 23 is then advanced into the mould on rails 24a, to the position of FIG. 1. The cylinder 84 is actuated to bring the spreader means 86 close to the mould surface, and cylinder 81 is operated to open the shutter 38 to the position shown in full lines, thus dumping the aggregate material which distributes itself within the mould. A cement mix is then fed onto the mould surface via the pipes 36 and 36a, and simultaneously the cylinder 84 is operated to raise the spreader means 86 gradually, so that these maintain contact with the cement mix and ensure that this is spread evenly within the mould. The cement mix is fed in while wet (with about 70 percent water) and rotation of the cylinder at a peripheral speed of 1,200 ft/min for about five minutes causes the wet cement to form a cylindrical layer 149 of uniform wall thickness on the inside of the mould, within an outer layer 195 of aggregate. The void ring 121 defines the end of the cylinder 149 of cement remote from plate 122. The centrifugal effect also concentrates and compacts the solid particles of the mix in the outer parts of the cement layer, and excess water is forced to the center of the mould and flows out of this during a de-watering stage.

The use of a cement mix containing only 70 percent water is in contrast to other methods where more than 90 percent excess water is required.

The de-watering stage is reached after the material has spun sufficiently to compact the solids into cylindrical form and to form an inner-layer of excess water. This takes about one minute. At this stage the cylinder 89 is operated to cause skimmer 88 to protrude from the lower surface of the spreader means, and cylinder 84 is operated to move the member 83 downwardly until the skimmer contacts the layer of water within the mould. The water is then skimmed off by pumping this through discharge pipe 90. In the final stages of de-watering, the spreader means 86 is brought into contact with the cement cylinder, and the vibrator 92 is activated to cause vibration of the spreader means, and compaction of the cement, while the mould continues to spin.

Once a hollow cement cylinder has been formed, and the de-watering and compacting steps have also been performed as described for the first embodiment, the end plate 122 is lifted clear (as in FIG. 5), the space within the shaft 144 is charged with compressed air, and the mandrel 140 is inserted into the cylinder, while the cylindrical mandrel surface formed by plate 141 is in its relaxed, contracted state, and while the mould is still spinning, so that the cement cylinder is maintained in contact with the liner.

As the mandrel approaches the position shown in FIG. 5, the plunger 166 pushes the void ring 121 away from the end of the cement cylinder 170, to the position shown in FIG. 5. In the latter stages of this movement, the flange 142 passes beyond the end of the cement, allowing expansion of the mandrel to occur. In this latter stage also, the valve arm 163a of the non-rotating mandrel strikes the arm 164 of the rotating mould, causing, firstly, rotation of the mandrel with the mould, and secondly opening the valve 163 to allow pressurized air to pass via conduits 162 from the interior of shaft 144 to air cylinder 161. Air cylinder 161 then expands, causing expansion of the outer surface of the mandrel into contact with the interior of the cement cylinder 149, with consequent expansion of the flange 142 into the space between the end of the cement cylinder and the void ring 121. Rotation of the mould is then stopped, the parts being then positioned as shown in FIG. 5. The carriage 148 is then withdrawn, carrying the mandrel which in turn causes the cement cylinder 149 together with liner 170 to be slid (without dimensional change) from the mould. During this movement, flange 142 acts as extracting means engaging the outer end of the cement cylinder and preventing the cement cylinder and liner from sliding off the mandrel.

FIGS. 6a and 6b show means for slitting the cylinders and laying out the resultant sheets. As shown, a series of similar pallets 185 is provided, each having a lug 186 extending along one edge and adapted to engage in the recesses of edge pieces 171 of the liners. As shown in FIG. 6b, just outside the lug 186 and parallel thereto is situated one strand 187 of a wire band saw, which saw is vertically movable relative to the pallet.

At each side of the pallets 185 is situated a vertical wall 189, having a horizontal tapered upper edge suitably spaced to engage an annular recess in the support shafts 144, 145 of the appropriate end of mandrel 140, as shown in FIG. 6a. The walls 189 are adjustable in height by raising means indicated at 190. When raised to their full height, the walls 189 are capable of forming a steam curing chamber when combined with the parts shown in FIG. 6c. These parts comprise a top 191 suitable for covering the space between walls 189, and hinged end pieces 192 sized to close the ends of the chamber.

In operation of the apparatus shown in FIG. 6, a first pallet 185 is laid between the walls 189 while the walls are in a lowered position. After a cement cylinder has been removed from the mould on the mandrel 140, the mandrel is positioned directly above the band saw 187, with its support shafts 144, 145 supported at one end of walls 189, and with the liner edge portions positioned as shown in FIG. 6b. The clip 175 is removed from the liner, and one edge portion only of the liner is then re-attached to the mandrel by two U-clips shown at 194, which have opposed flanges engaging the inside of the mandrel and the outside of the edge piece 171, one clip being used at each end of the mandrel. The other edge portion 171 is engaged by lug 186 as shown in FIG. 6b. The wire band saw 187 is then operated to cut through the cement cylinder, the saw passing between the liner edge portions, by deflecting the edge portions where they abut. The cylinder and liner are then rolled out flat on the pallet 185, with one end of the liner remaining attached to the pallet and the other end remaining clipped to the mandrel until enrolled. During this unrolling operation, the mandrel support shaft 144 and 145 roll and slide along the top edges of walls 189, the movement of the mandrel being such as to stretch and roll the sheet of cement.

After a first sheet of cement has been laid out as described, a further pallet 185a is laid thereon, and the next sheet is laid on this further pallet, this operation being repeated until a stack of pallets interposed with sheets of cement and liners is produced. As successive sheets of cement and pallets are laid down, the walls 189 are raised by raising means 190, so as to continue to support the mandrel during each unrolling operation. After a stack of about 20 cement sheets have been laid out in this manner, and with the walls 189 raised to their maximum height, a curing chamber is formed by arranging on these walls the top 191 and end pieces 192 as shown in FIG. 6c. The stack of cement sheets is then steam cured to harden them after which the sheets are removed and the pallets and liners recovered for re-use. It may be noted that the sheets are cured and hardened without being moved from the position in which they are laid out.

The liners may be re-used by being bent up around a suitable mandrel, and cleaned on their external surfaces before being inserted into the mould. After insertion into the mould the inner surfaces are cleaned and oiled while the mould is slowly rotated.

The mandrel described may of course be modified in various respects. Thus it is not essential that the air reservoir be provided by the space within the shaft 144; instead a separate reservoir, rotatable with the mandrel, could be used. Also, the valve actuator need not be pivotal, the essential feature being that this extends outwardly beyond the cylindrical surface of plate 141; and may be moved to open the valve by means on the mould which engages the valve actuator when the mandrel is almost fully inserted into the mould. Furthermore, a compressed gas other than air may be used.

The apparatus shown in FIGS. 7 to 14 includes a modified mould particularly shown in FIGS. 7 and 8. This mould is generally similar to that of the previous embodiment in having a rotatable cylindrical shell 212 held by reinforcing rings 215, which rest on rollers 216 rotated by means similar to those described in the previous embodiment. The mould has a fixed end plate 221 held by studs 221b, and a removable end plate 222 mounted by means similar to those described with reference to FIGS. 1 and 2 and which will not be further described. The fixed end plate 221 is of annular form, having a central aperture large enough to admit a charging head 223, similar to charging head 23 already described.

The mould as shown in FIG. 7 also includes a removable liner 240, in the form of a sheet of flexible metal having inwardly turned flanges 242 along its opposite edges. When the liner is bent into cylindrical form and placed in a mould these flanges are spaced a short distance apart and form opposite sides of a longitudinal division in a cement cylinder spun in the mould. Each flange 242 has a lateral extension 243, the extensions 243 overlapping and holding between them a strip of sealing material 244 (see FIG. 8).

The flanges 242 each have two rows of apertures 246, namely an upper row of apertures 246a and a lower row of apertures 246b. The upper apertures 246a are adapted to be engaged by the mandrel in a manner to be described with reference to FIG. 10. The lower apertures 246b of each flange are engaged, as shown in FIGS. 7 and 8, by locking means constituted by a series of hooks 247 mounted on a shaft 248 extending longitudinally of the mould and carried by brackets 249 mounted externally of the mould. The hooks 247 extend through apertures in the mould wall to engage the liner apertures 246b, the space within the mould occupied by these hooks being protected from ingress of cement by the seal formed by sealing strip 244 and the flange extensions 243. Clearly, all the hooks of one series, i.e., attached to one of the shafts 248, can simultaneously be engaged with the apertures 246b of one flange, simply by rotating the respective shaft 248 by means of a handle shown at 248a. The liner can thus be inserted into the mould with the end plate 222 removed and with the hooks 247 in a position to clear the flanges 242, and handles 248a are operated after insertion of the liner to hold this in position.

The apparatus also includes a special cylindrical mandrel 250, which is shown in FIG. 9. The mandrel has a cylindrical outer wall 250a, the diameter of which is selected so that this can be inserted into a cement cylinder which has been formed in the mould, to engage the inner surface of such a cylinder directly, without dimensional change of the cylinder. The ends of the mandrel are closed by end plates 251, to the centre of which are welded tubular guide members in the form of shafts 252.

One longitudinal portion of the mandrel, shown at 254 at the bottom of FIG. 9 and enlarged in FIG. 10, is recessed, and this recessed portion is provided with holding means in the form of hooks 255 for engaging the upper apertures 246a of the flanges 242 of the liner. The hooks 255 are carried by two parallel shafts 256, extending longitudinally of the mandrel and supported by transverse members 257 within the recess 254 of the mandrel. As shown in FIG. 10, in one rotational position of each shaft 256 the hooks 255 of that shaft engage with the apertures 246a of one flange 242, and the shafts 256 are rotatable from this position to a position in which the hooks 255 are clear of the flanges. Clearly, the hooks attached to one of the shafts can be engaged simultaneously with the apertures 246a of one flange by rotation of the respective shaft 256 by a handle 256a which extends out of the front of the mandrel; since shafts 256 are independently operable each edge of the liner can be selectively attached to the mandrel.

FIGS. 11 and 12 show end views of the mould in which a cement cylinder 258 has been spun, and subsequently the mandrel 250 has been inserted into the spun cement cylinder. As shown in FIG. 11 the hooks 247 of the mould are still engaged with the flanges 242 of the liner, as in the spinning position, and hooks 255 of the mandrel are as yet not engaged with the liner. As shown in FIG. 12, the hooks 247 of the mould have been disengaged by rotation of shafts 248, and the mandrel hooks 255 have been engaged with the liner by the rotation of shafts 256. In this position, the liner is held securely by the mandrel, so that the mandrel can be withdrawn from the mould with the liner holding the cement cylinder in place around the mandrel. It will be understood that the apparatus includes mounting means for the mandrel which may be in the form of ordinary handling means such as a hoist or small crane, and which supports the mandrel by the shafts 252. This mounting means must allow axial movement of the mandrel into the mould, and rotation of the mandrel after removal of the mandrel from the mould to allow the cement sheet to be unrolled from the mandrel, while relative transverse movement is provided between the mandrel and the surface which receives the sheet. The mandrel may also be carried by the special handling means 148 already described.

A further part of the apparatus is a surface onto which the cement sheet can be laid after removal from the mandrel. A suitable pallet is indicated at 260 in FIGS. 13 and 14, the latter drawing showing an enlarged view of one end of the pallet. The pallet is a flat supporting surface having lugs 262 projecting from one end, which lugs support a rotatable shaft 265 extending along one edge of the pallet. The shaft 265 carries hooks 264 which are engageable with the apertures 246b of the flanges 242 of the liner. A handle (not shown) is provided for rotating shaft 265, so that when the mandrel, with liner and cement cylinder in place, is to be laid out onto the pallet, one flange of the liner is firstly attached by the hooks 264 to the pallet and simultaneously released by the corresponding mandrel hooks 255, the cement sheet being then unrolled as shown in FIG. 13, after which the other end of the liner is released from the mandrel.

In the first stage of the process using the apparatus of FIGS. 7 to 14 a suitable liner 240 is bent into cylindrical form and inserted into the end of the mould from which end plate 222 has been removed. The liner flanges 242 are suitably positioned within the mould and the liner is then secured in position by rotating the handles 248a to engage hooks 247 with the apertures 246b. The end of the mould is then closed by end plate 222.

Next, a cement cylinder of desired form is produced by feeding a cement mix (with water) into the mould 10 by means of charging head 223, directly onto the inner surface of liner 240, and rotating the mould, generally as described with reference to the embodiment of FIGS. 1 to 6. The cement mix is distributed, and de-watered, also in the manner previously described.

After de-watering, the mould is spun for about another 30 seconds, at which stage end plate 222 is removed to the horizontal position by operation of cylinder 231. The cylindrical mandrel 250 is then positioned in the mould, while supported by suitable means such as the carriage 148 of FIG. 3, and preferably with the mould still rotating.

When the mandrel is in place, rotation of the mould is stopped, and the handles 248a are operated to release the liner flanges 242 from the hooks 247. The handles 256a are then operated to engage hooks 255 with the liner flanges, as indicated in FIGS. 11 and 12. The mandrel is then removed from the mould, carrying the cement cylinder. It will be understood that the hooks 246a act in the same manner as clip 175 to releasably connect together the flanges of the liner, so that the liner holds the cement cylinder on the mandrel.

The cylinder which has been formed within the mould has a longitudinal division the sides of which are formed by the liner flanges 242, which have a radial dimension larger than the cylinder formed, i.e., larger than the radial differences in dimensions of the outer surface of the mandrel and the inner surface of the mould. The material fed into the gap between the flanges is largely forced into the other parts of the mould by centrifugal effect during spinning. After removal from the mould, therefore, the cement cylinder can readily be split longitudinally along this division. This is achieved by attaching one liner flange to the pallet 260 by means of hooks 264 (see FIG. 14), and also releasing this liner flange from the mandrel. The cement cylinder is then unrolled from the mandrel as shown in FIG. 13, and laid out on the pallet to harden.

The liner used in the process described herein may form a part of the final product, and become firmly bonded to the cement sheet during the hardening of the sheet on the pallet. Alternatively, a re-usable liner may be used, which is separated from the cement sheet either before of after this has hardened. Where a smooth liner with good draw is used, separation may be effected before the sheet hardens. A re-usable liner is particularly useful where it is required to produce a cement sheet having a relief design on its surface; in this case a metal sheet liner, bonded to silicone rubber embossed with the required design can be used. Such a relief design liner would be removed after hardening of the cement; in this case, a release coating would be applied to the liner before being inserted into the mould.

FIGS. 15 and 16 show views of a combination mandrel, which is usable with a liner having elements attachable to hooks of the mandrel, and is also equipped for use as a vacuum mandrel, for example if used with a liner not having radially extending elements engageable with the mandrel. The outline form of the mandrel is similar to that of FIGS. 9 and 10, but the mandrel surface is provided with ports 270 to which a vacuum or positive pressure can be applied. The internal construction of the mandrel is very similar to that of the mandrel described with reference to FIGS. 3 to 8 of my co-pending United States Application Ser. No. 166,779 and includes a series of longitudinal channels each communicating with longitudinal series of ports 270, and each being individually connected to a vacuum header tube 272 and a pressure header tube 273 by valve means. The valve means are individually operable to place the ports of any longitudinal series in communication with either the vacuum or pressure header. When the mandrel is inserted in a mould, the valves are operated to connect all of the ports to the vacuum, and the vacuum is maintained until the cement sheet has been placed on a pallet. Once the cement sheet begins to be unrolled, the valves are operated to change successive series of ports from vacuum to a positive pressure, thus aiding gradual release of the cement sheet from the mandrel.

When used for the vacuum type process, this combination mandrel may be used in association with a longitudinal inwardly projecting member indicated at 275 in FIG. 16, which fits within the longitudinal recess of the mandrel and which forms a longitudinal division in the cement cylinder. Alternatively, such a longitudinal division may be formed by a liner with inwardly directed flanges.

FIG. 17 shows a de-watering device applied to the removable end plate of the mould, and which may be used in any of the above described moulds instead of the skimmer associated with the charging head. The end plate (shown as 222), incorporates an annular plate ring 333 covering the outer part of end part of end plate. The plate ring 333 is held in contact with the end plate by retaining bolts 334 which are movable in curved slots 335 in the plate ring 333, so that this ring can be rotated with respect to the end plate. The end plate and plate ring 333 are provided with water outlet holes 337 and 338 respectively which are aligned in one rotational position of the plate ring, to allow water to flow from the mould, but in the rotational position shown in FIG. 17 the holes 337 are displaced from holes 338 so that water cannot escape through these. The plate ring 333 is provided with an arm 339 which can contact a spring loaded trip stop 339a while the mould is rotating so causing the plate ring 333 to rotate to bring holes 337 and 338 into correspondence so that excess water in the mould can escape.

I claim:

1. Apparatus for forming into sheet form a flowable hardenable material such as a cement mix, comprising:
   a. a cylindrical mould mounted for rotation on a horizontal axis and having a removable end plate, said mould and end plate being such that a cylindrical body formed within the mould can be extracted by sliding without dimensional change after removal of said end plate;
   b. means for feeding said material directly onto the inner surface of a liner held within said mould;
   c. a mandrel movable axially into the mould through the end of the mould having the removable end plate, said mandrel having a cylindrical surface engageable with the inside surface of a hollow cylindrical body of the material formed within the mould by spinning;
   d. mounting means for said mandrel allowing movement thereof axially into the mould and also allowing rotation thereof after removal from the mould and allowing relative transverse movement between the mandrel and a receiving surface for the sheet;

e. a flexible liner dimensioned to fit within the cylindrical inner surface of the mold, the edges of said liner which are adjacent each other when in the mould being provided with radially extending elements;

f. releasable connecting means for holding said radially extending elements to prevent separation thereof after removal of said mandreal, with said hollow cylindrical body and said liner, from the mould, and g. means for forming a longitudinal division in said cement body, to allow the body to be unrolled from the mandrel after removal from the mould.

2. Apparatus according to claim 1, wherein said radially extending elements are inwardly directed flanges which are of greater radial extent than the radial difference in dimensions between the curved outer surface of the mandrel and the curved inner surface of the mould, whereby said flanges also constitute said means for forming a longitudinal division in said cement body.

3. Apparatus according to claim 1, wherein said radially extending elements are outwardly directed flanges which flanges are spaced apart while the liner is in the mould so that after extraction from the mould the cylinder of material can be slit while the liner is still in place.

4. Apparatus according to claim 3, further including clip means adapted to engage said outwardly directed flanges of the liner when the cylinder is being removed from the mould, said clip means being removable to allow slitting means for forming the longitudinal division in said cement body to pass between the liner edges.

5. Apparatus according to claim 1, wherein said mould includes an annular member situated in said mould so as to define an end of said cylinder remote from that end adjacent the removable end plate, said annular member being movable axially of the mould and away from the end of said cylinder formed therein, and wherein said means for holding the cylinder on the mandrel includes extracting means contractible to the internal diameter of a cylinder formed within the mould and expandible into a space formed between said annular member and the cylinder on movement of said member away from the formed cylinder, whereby the said extracting means can engage the end of the cylinder remote from the removable end plate to hold the cylinder on the mandrel while the mandrel is withdrawn from the mould.

6. Apparatus according to claim 2, wherein said releasable connecting means includes hook members movably mounted on said mandrel and engageable with said inwardly directed flanges.

7. Apparatus according to claim 6, wherein said mandrel includes hook members engageable selectively with one or other or both of the flanges of said liner, whereby both edges of the liner are individually attachable to the mandrel.

8. Apparatus according to claim 7, wherein said liner flanges are provided with elements engageable by locking means carried by the mould.

9. Apparatus according to claim 8, wherein said liner edges include flanges having apertures, and wherein said apertures of each flange are engageable by a series of hooks carried on a shaft rotatably mounted on the mould, said hooks of each series being simultaneously engageable with said apertures of one flange by rotation of the respective shaft.

10. Apparatus for forming into sheet form a flowable hardenable material such as a cement mix, comprising:

a. a cylindrical mould mounted for rotation on a horizontal axis and having a removable end plate, said mould and end plate being such that a cylindrical body formed within the mould can be extracted by sliding without dimensional change after removal of said end plate;

b. means for feeding said material directly onto the inner surface of a liner held within said mould;

c. a mandrel movable axially into the mould through the end of the mould having the removable end plate, said mandrel having a cylindrical surface engageable with the inside surface of a hollow cylindrical body of the material formed within the mould by spinning;

d. mounting means for said mandrel allowing movement thereof axially into the mould and also allowing rotation thereof after removal from the mould and allowing relative transverse movement between the mandrel and a receiving surface for the sheet; and e. a flexible liner dimensioned to fit within the cylindrical inner surface of the mould, the edges of said liner which are adjacent each other when in the mould being provided with radially extending flanges, said flanges extending inwardly by an amount greater than the radial difference in dimensions between the curved outer surface of the mandrel and the curved inner surface of the mould, whereby said flanges constitute means for forming a longitudinal division in said cement body, to allow the body to be unrolled from the mandrel after removal from the mould;

11. Apparatus according to claim 1, wherein said cylindrical surface of the mandrel is constituted by a cylindrically curved, flexible plate, and wherein said mandrel includes means for expanding said plate after insertion of the mandrel into a cylinder in the mould.

12. Apparatus according to claim 11, wherein said plate includes an outwardly directed flange at the outer end of the mandrel, said expanding means being capable of causing radial expansion of said plate by an amount at least equivalent to the radial extent of said flange, whereby said flange can be caused to engage the end of a cylinder of material formed in the mould to assist in sliding the cylinder from the mould.

13. A mandrel for use in removing a hollow cylinder of material centrifugally formed within a mould, comprising:- a cylindrically curved, flexible plate.

a shaft extending axially of said plate and being mounted for continuous rotation in a support, expanding means including a linkage connecting said shaft with said plate, and also including a pneumatic cylinder connected to said linkage in such manner as to cause said linkage to expand said plate when the cylinder is supplied with pressurized gas, a gas reservoir contained within the mandrel and rotatable therewith, connector means being provided so that said reservoir can be pressurized with compressed gas at least when the mandrel is stationary, conduit means connecting said reservoir to said pneumatic cylinder, shut-off valve means interposed in said conduit means, and a valve actuator for operating said valve means, whereby said reservoir can be charged with compressed gas via said connector means while the mandrel is stationary, and whereby said valve actuator may be operated upon insertion of the mandrel into a mould to cause compressed gas in said reservoir to operate said expansion means while the mandrel is rotating.

14. A mandrel according to claim 13, wherein said plate includes an outwardly directed flange at the outer end of the mandrel, said expanding means being capable of causing radial expansion of said plate by an amount at least equivalent to the radial extent of said flange, whereby said flange can be caused to engage the end of a cylinder of material formed in the mould to assist in sliding the cylinder from the mould.

15. A mandrel according to claim 13, wherein said reservoir is a hollow space within said shaft.

16. A mandrel according to claim 13, wherein said valve actuator extends outwardly beyond the cylindrical surface of said plate, whereby said valve actuator may be operated to open the valve means by a means on said mould which engages said valve actuator when the mandrel is almost fully inserted into the mould.

* * * * *

UNITED STATES PATENT OFFICE
CERTIFICATE OF CORRECTION

Patent No. 3,778,206    Dated December 11, 1973

Inventor(s) WILLIAM C. BARRATT

It is certified that error appears in the above-identified patent and that said Letters Patent are hereby corrected as shown below:

In the heading of the patent, line [30] before the reference to the British application on which a claim for priority is based, insert --July 31, 1970 Canada. . . . . 089,699--.

Signed and sealed this 16th day of April 1974.

(SEAL)
Attest:

EDWARD M. FLETCHER, JR.
Attesting Officer

C. MARSHALL DANN
Commissioner of Patents